US008468598B2

(12) United States Patent
Hebert

(10) Patent No.: US 8,468,598 B2
(45) Date of Patent: Jun. 18, 2013

(54) PASSWORD PROTECTION TECHNIQUES USING FALSE PASSWORDS

(75) Inventor: Cedric Hebert, Mougins (FR)

(73) Assignee: SAP AG, Walldorf (DE)

( * ) Notice: Subject to any disclaimer, the term of this patent is extended or adjusted under 35 U.S.C. 154(b) by 178 days.

(21) Appl. No.: 12/857,066

(22) Filed: Aug. 16, 2010

(65) Prior Publication Data

US 2012/0042364 A1   Feb. 16, 2012

(51) Int. Cl.
*G06F 11/00* (2006.01)
*G06F 21/00* (2006.01)

(52) U.S. Cl.
USPC ............................................. 726/22; 713/183

(58) Field of Classification Search
None
See application file for complete search history.

(56) References Cited

U.S. PATENT DOCUMENTS

| 6,038,315 | A * | 3/2000 | Strait et al. ........................ 713/183 |
|---|---|---|---|
| 6,151,593 | A * | 11/2000 | Cho et al. .......................... 706/16 |
| 7,161,468 | B2 * | 1/2007 | Hwang et al. ................... 340/5.82 |
| 7,219,368 | B2 * | 5/2007 | Juels et al. ........................ 726/2 |
| 7,549,574 | B2 * | 6/2009 | Crowell et al. ................. 235/379 |
| 7,748,040 | B2 * | 6/2010 | Adelstein et al. ............... 726/25 |
| 7,980,464 | B1 * | 7/2011 | Sarris et al. ..................... 235/379 |
| 2002/0046351 | A1 | 4/2002 | Takemori et al. |
| 2003/0005287 | A1 | 1/2003 | Wray et al. |
| 2004/0168069 | A1 | 8/2004 | Knight |
| 2004/0255155 | A1* | 12/2004 | Stading .......................... 713/201 |
| 2006/0059550 | A1 | 3/2006 | Kausik |
| 2006/0137012 | A1 | 6/2006 | Aaron |
| 2009/0328199 | A1* | 12/2009 | Gilfix et al. ..................... 726/19 |

OTHER PUBLICATIONS

Extended European Search Report for EP Application No. 09290182.6, mailed May 25, 2010, 9 pages.
Liang, et al, "RFID System Security Using Identity-Based Cryptography", Ubiquitous Intelligence and Computing, Jun. 2008, 8 pages.
Ateniese, et al, "Improved Proxy Re-encryption Schemes with Applications to Secure Distributed Storage", ACM Transactions on Information and System Security, vol. 9, No. 1, Feb. 2006, 30 pages.
Ateniese, et al, "Untraceable RFID Tags via Insubvertible Encryption", Proceedings of the 12th ACM Conference on Computer and Communications Securty, Nov. 2005, 10 pages.
Saito, et al, "Enhancing Privacy of Universal Re-encryption Scheme for RFID Tags", LNCS, vol. 3207, Jul. 2004, 12 pages.
Kerschbaum, et al, "RFID-Based Supply Chain Partner Authentication and Key Agreement", Second ACM Conference on Wireless Network Security, Mar. 2009, 10 pages.
Juels, et al, "Unidirectional Key Distribution Across Time and Space with Applications to RFID Security", 17th USENIX Security Symposium, Aug. 2008, 16 pages.
Non-Final Office Action for U.S. Appl. No. 13/331,972, mailed Mar. 20, 2013, 13 pages.

(Continued)

*Primary Examiner* — Nathan Flynn
*Assistant Examiner* — Abdullah Almamun
(74) *Attorney, Agent, or Firm* — Brake Hughes Bellermann LLP

(57) ABSTRACT

A password manager may receive a password, and a false password generator may generate at least one false password, based on the password. A false password selector may store the at least one false password together with the password. A password handler may receive a login attempt that includes the at least one false password, and an attack detector may determine that the login attempt is potentially unauthorized, based on the receipt of the at least one false password.

14 Claims, 4 Drawing Sheets

OTHER PUBLICATIONS

Extended European Search Report for EP Application No. 12008286.2, mailed Apr. 8, 2013, 8 pages.

Lee, et al, "Detecting and Defending Against Web-Server Fingerprinting", Proceedings of the 18th Annual Computer Security Applications Conference (ACSAC'02), Dec. 9, 2002, 10 pages.

Weiler, "Honeypots for Distributed Denial of Service Attacks", Proceedings of the 11th International Workshops on Enabling Technologies: Infrastructure for Collaborative Enterprises (WETICE '02), Jun. 10, 2002, 6 pages.

* cited by examiner

PASSWORD PROTECTION TECHNIQUES USING FALSE PASSWORDS

TECHNICAL FIELD

This description relates to computer security, and, more specifically, to user authentication using passwords.

BACKGROUND

In the field of computer security, many techniques exist for authenticating or otherwise securing user access to a computer or to a specific computing resource. In particular, it is well-known to associate a user with a confidential password, usually in conjunction with a log-in name or other identifier that is also associated with the user, and to then require entry of the appropriate identifier/password combination before granting access to a requested computer or computing resource.

Ideally, only the user or an authorized agent of the user will have knowledge of the password required to gain access to the computer or computing resource in question. In practice, however, it may be possible for unauthorized actors to obtain the required password, and thereby to gain elicit access to the computer or computing resource in question.

For example, a user may obtain a password for accessing a computing resource. At a later time, an unauthorized user may attempt to guess or otherwise determine the password in question. For example, the unauthorized user may utilize well-known techniques for attempting to determine a desired password. For example, such techniques may involve "brute force" techniques, in which different combinations of characters or symbols (e.g., letters or numbers) are selected and attempted repetitively, either at random or in a specified manner, until if and when the actual correct password is selected and attempted.

In order to prevent a success of these and various other known techniques for illicitly determining a desired password, authorized users in the process of password creation may be advised, requested, or required to select a password that is thought to be relatively unsusceptible to determination by such techniques. Such passwords may generally be referred to as "strong" passwords, where, in this context, the strength of a password may generally be understood as being inversely proportional to the susceptibility to the types of password determination techniques referenced above. That is, stronger passwords, by definition, are less susceptible to one or more password-determination techniques. Known metrics exist for measuring password strength, which may consider, for example, inclusion of non-alphanumeric characters, mixing of different types of characters (e.g., letter and numbers), a length of time that a given password has been in use, and other factors which are thought to influence password susceptibility (e.g., factors which influence a likelihood of determining a password, or which influence a quantity of time and/or computing resources needed to determine a password).

However, such measures of password strength may vary, e.g., depending on the type of password determination technique that is being used. Moreover, it may be difficult or inconvenient for users to create and utilize passwords having required levels of strength, or otherwise to maintain their passwords in a way which minimizes susceptibility to determination thereof by potential unauthorized users. Consequently, although reliance on password-based protection schemes remain prevalent throughout the field of computer security, it is often the case that the actual protection provided thereby may be inadequate, and may provide a relative point of weakness in providing secured user access.

SUMMARY

According to one general aspect, a computer system may include instructions recorded on a computer-readable storage medium and readable by at least one processor. The system may include a password manager configured to cause the at least one processor to receive a password, a false password generator configured to cause the at least one processor to generate at least one false password, based on the password, and a false password selector configured to cause the at least one processor to store the at least one false password together with the password.

According to another general aspect, a computer-implemented method for causing at least one processor to execute instructions recorded on a computer-readable storage medium may include receiving a password, generating at least one false password, based on the password, storing the password together with the at least one false password, receiving a login attempt that includes the at least one false password, and determining that the login attempt is potentially unauthorized, based on the receipt of the at least one false password.

According to another general aspect, a computer program product tangibly embodied on a computer-readable medium may include instructions that, when executed, are configured to cause at least one processor to receive a password, generate at least one false password, based on the password, store the password together with the at least one false password, receive a login attempt that includes the at least one false password, and determine that the login attempt is potentially unauthorized, based on the receipt of the at least one false password.

The details of one or more implementations are set forth in the accompanying drawings and the description below. Other features will be apparent from the description and drawings, and from the claims.

DETAILED DESCRIPTION

Figure 1:
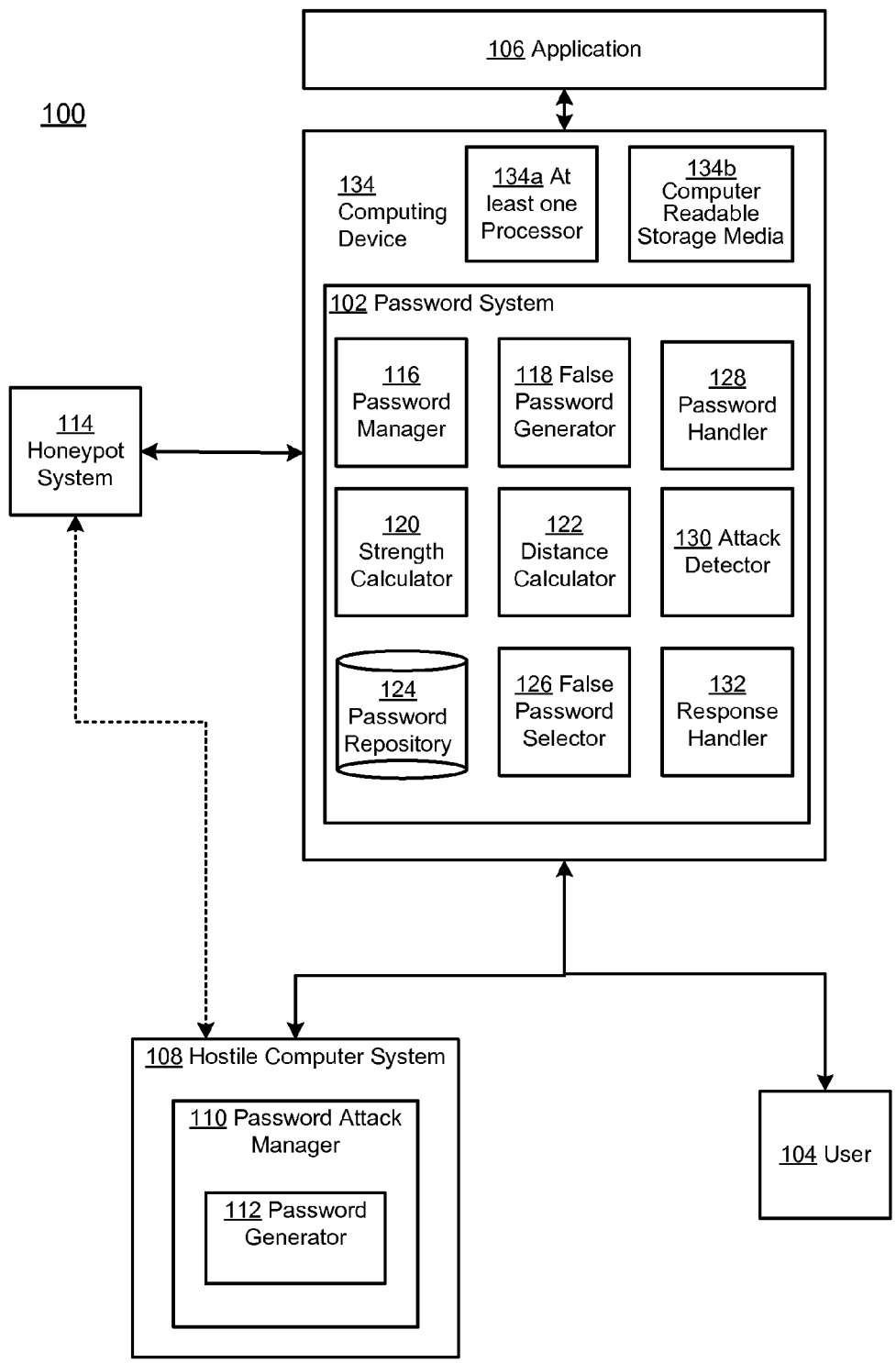
FIG. 1 is a block diagram of a system for providing password protection using false passwords.

FIG. 1 is a block diagram of a system 100 for implementing password protection using false passwords. More specifically, in the system 100, a password is associated with a plurality of false passwords. Consequently, any unauthorized user attempting to determine the actual or authentic password may have difficulty in doing so, and may, for example, inadvertently determine, and thereafter attempt to use, an associated false password. As a result, attacks or other unauthorized accesses by such unauthorized users may be minimized or eliminated, and an overall level of security associated with use of the actual password may be increased, without requiring any additional knowledge or effort on the part of a user associated therewith. Various other features and advantages of the system 100 are provided in more detail, below.

In the example of FIG. 1, a password system 102 is illustrated as providing password-based access for a user 104 to an application 106. In this regard, it may be appreciated that the password system 102 may be used in virtually any context in which password-based security techniques are appropriate or desired. That is, for example, the user 104 may be understood to represent virtually any human or automated user which may be associated with a password, and may be able to provide such password in order to gain access to the application 106. Thus, similarly, the application 106 may be understood to represent any computer or computing resource which may be desired to be associated with secure access thereto by the user 104 using the associated password.

Thus, examples of the user 104 and/or the application 106 would be well known to one of skill in the art, and are too numerous to mention here in any detail. Nonetheless, some such examples are provided herein, for the sake of illustration, and without intending to limit a scope of use of the system 100 of FIG. 1. For example, the application 106 may represent an e-commerce website over which the user 104 wishes to make a purchase. In other examples, the user 104 may be an employee, and the application 106 may represent some or all of a work environment of the user 104 as provided by the user's employer. Other examples are provided below, or would be apparent.

Thus, in the example of FIG. 1, the user 104 may access the application 106 by providing a correct password to the password system 102. For example, the application 106 may be publicly available, e.g., over the internet, and the user 104 may simply access the application 106 over the internet. In these and many similar scenarios, a hostile computing system 108 may similarly be able to attempt to access the application 106, e.g., over the internet. In such a case, as referenced herein, the hostile computing system 108 may be able to access a personal account or profile of the user 104 by providing the correct password to the password system 102, to thereby access the application 106.

In order to attempt to determine the correct password, the hostile computing system 108 may include a password attack manager 110, which may be configured to execute a password generator 112 and related algorithms designed to assist the user of the hostile computing system 108 in guessing, deriving, or otherwise determining the correct password needed for access to the application 106 (and associated access to confidential information of the user 104).

Algorithms for attempting to determine the password in such scenarios, as referenced above, are well known. For example, the password generator 112 may be configured to randomly generate character sequences in an iterative manner, until if and when the correct password is eventually obtained. In other conventional algorithms, the password generator 112 may begin with known (e.g., dictionary) words or other character sequences, and may thereafter generate variations thereof, again in a repetitive or iterative fashion until if and when a suitable password is obtained.

In the system 100 of FIG. 1, however, as described herein, the password system 102 is configured to determine and associate a plurality of false passwords which are associated with the user 104, i.e., associated with the password of the user 104 needed to access the application 106. In this case, it may occur that the hostile computing system 108, using the password attack manager 110 and the password generator 112, may generate such a false password for entry into the password system 102. In this case, the password system 102 may become aware of the potential for attack or other unauthorized entry or access to the application 106. In other words, the password system 102 may deduce from receipt of such a false password that the party providing the false password is not, in fact, the user 104, but rather an unauthorized user of unknown identity.

Consequently, the password system 102 may take one or more actions in response to the receipt of such false password(s), and in response to the associated potential for unauthorized access by a hostile entity. Detailed examples are provided below, but, in general, the password system 102 may take the approach of attempting to deter, halt, and/or identify an unauthorized entity such as a user of the hostile computing system 108. For example, the password system 102 may redirect the provider of the false password, i.e., the user of the hostile computing system 108, to a honey pot system 114. Such honey pot systems are well-known in other contexts, and generally refer to systems which are intentionally designed to deceive a hostile party into believing that a desired access has been achieved. Then, the honey pot system 114 may, in fact, track actions of such unauthorized users.

For example, the honey pot system 114 may be configured to implement a setting or other context which mimics an appearance and functionality of the application 106. Consequently, the user of the hostile computing system 108 may determine and enter a false password, and may thereafter believe that success has been achieved in accessing the application 106, when, in fact, the unauthorized user has actually accessed the honey pot system 114. At this point, the honey pot system 114 may be configured to monitor or otherwise track actions of the unauthorized user, to thereby attempt to deter and/or identify an unauthorized user, as described above.

In the specific example implementations of the system 100 of FIG. 1, the password system 102 is illustrated as including a password manager 116, which may be configured to implement otherwise-conventional functionality related to an initial provisioning (or subsequent re-provisioning) of a password to the user 104. For example, the user 104 may initially access the application 106 over the internet, and may wish to create a confidential user profile to be associated with the application 106. As part of this process, the password manager 116 may request the user 104 to provide a unique user name and associated password to be associated with the user profile within the application 106. The user may thus enter a desired password.

In conjunction with the operations of the password manager 116, a false password generator 118 may be configured to generate or otherwise provide potential false passwords to be associated with the actual password associated with the user 104. For example, the false password generator 118 may receive the password from the password manager 116, and may execute one or more algorithms to modify the password and obtain an associated false password. For example, the false password generator 118 may receive the password and, e.g., may alter or replace one or more characters thereof with different characters, or may add or remove characters therefrom.

In the example implementations of FIG. 1, a strength calculator 120 may be configured to calculate a strength of the password, and of each of the potential false passwords generated by the false password generator 118. As referenced above, and as generally known, the password strength in this context generally refers to a measure of difficulty that would be experienced by the hostile computing system 108 in guessing, deriving, or otherwise determining the password or the associated false passwords. As such, various metrics for measuring password strength may be used by the strength calculator 120, depending on a preference of an operator of the password system 102, known factors associated with the hostile computing system 108, or other factors that would be apparent to one of skill in the art.

In general, such strength metrics or algorithms used by the strength calculator 120 may consider, for example, that longer passwords (e.g., passwords having more characters), are generally considered stronger than passwords having relatively fewer characters. In additional or alternative examples, passwords having only lowercase letters may be considered to be weaker than passwords which have combinations of lowercase letters with uppercase letters, numbers, and/or special characters (e.g., explanation marks, ampersands, or other non-alpha/numeric characters).

Further in the example of FIG. 1, a distance calculator 122 is illustrated which may be configured to execute various metrics or other algorithms for determining a distance between the password of the user 104 and each of the potential false passwords generated by the false password generator 118. In this context, the term distance generally refers to a similarity or lack thereof between the password and a given false password. As with the strength calculator 120, many existing techniques for calculating distance may be executed by the distance calculator 122.

For example, the Hamming distance is a known technique for measuring distance between two words or other character strings. The Hamming distance counts a number of characters which have been replaced within one character string in order to obtain the second character string. For example, a Hamming distance between the term "rope" and the term "rose" would be considered to be a value of 1, because a single character (i.e., the letter "p") was replaced in order to obtain the altered character string (i.e., the word "rose").

In the example of FIG. 1, one specific technique for measuring a distance the password and a given false password may rely on a physical, measured distance between characters within a given keyboard layout. For example, for a given password that includes the letter S (e.g., "rose"), a distance to a specific false password which includes the character A at a same position within the password string (e.g., "roae") may be considered to be less than a distance between the password and a false password which includes the letter L in the position of the letter S within the password (e.g., "role"). That is, because the letter A is physically closer to the letter S within a conventional qwerty keyboard layout than is the letter L to the letter S, the distance calculator 122 may determine that a corresponding distance measure for a first password which replaces and S with an A is less than a distance measured for a second false password which replaces an S of the password with the letter L in a second false password.

Various other examples and details of operations of the strength calculator 120 and the distance calculator 122 are provided below. However, for purposes of understanding the functionality of the system 100 of FIG. 1, it may be appreciated that a false password selector 126 may be configured to access, execute, or otherwise utilize operations of the calculators 120, 122 in order to select false passwords provided by the false password generator 118 for subsequent storage within a password repository 124 in association with the password of the user 104.

Thus, in operation, the password manager 116 allows the user 104 to select a desired password, and the false password generator 118 subsequently generates a plurality of false passwords, at least some of which may be associated with the password. The false password selector 126 may be configured to select which of the generated false passwords will ultimately be associated with the password and stored within the password repository 124. In particular, as referenced above, the false password selector 126 may govern an operation of, and results provided by, the false password generator 118, using the strength calculator 120 and/or the distance calculator 122.

Many different functionalities and algorithms may be used by the false password selector 126 in controlling operations of the false password generator 118, the strength calculator 120, and the distance calculator 122. For the sake of illustration, a number of examples of such functionalities and associated algorithms are provided below. However, it will be appreciated that such examples are not limiting as to a number and type of techniques that may be used to generate, associate, and store a plurality of desired false passwords with a password of the user 104.

For example, the false password selector 126 may be configured to control an operation of the distance calculator 122 so as to select false passwords which are at least a minimum distance from the password user 104, and/or which are less than a maximum distance from the password. For example, as referenced above, one advantage of the system 100 of FIG. 1 is that the system 100 provides additional levels of security for the user 104, without requiring additional efforts from, or even knowledge by, the user 104. In other words, for example, the user 104 should be able to provide his or her selected password and gain access to the application 106, without even being aware of the various operations of the password system 102 as described herein.

However, in conventional situations, it is not uncommon for a user to inadvertently enter an incorrect password, e.g., due to a typographical error, or due to an error of the user 104 in remembering the password. For example, the user 104 may inadvertently enter an incorrect password, e.g., by accidentally transposing one character for another during entry of the password. In such a case(s), the user 104 may thereby inadvertently (and without intention or knowledge) enter a false password which was stored in association with the password 104 within the password repository 124. Consequently, the user 104 may be incorrectly perceived by the password system 102 as a potentially hostile or malicious entity attempting to gain access to the application 106. In such situations, the password system 102 may take various actions in response, which would be unsuitable and inappropriate in responding to such an inadvertent entry by the user 104. Moreover, such actions may make the user 104 aware of operations of the password system 102, which may be undesirable to an operator of the password system 102. Thus, by ensuring that each false password is a minimum distance from the actual password, the odds of inadvertent entry of a false password by the user 104 may desirably be reduced.

Additionally, or alternatively, it may be desirable to ensure that each false password is less than a maximum distance from the actual password. For example, as referenced above, it may occur that an operator of the hostile computing system 108 may attempt to exhaustively obtain all available passwords for the application 106. In this case, an operator of the hostile computing system 108 may become aware that multiple passwords exist, which at least appear to grant entry and access to the application 106. In many cases, the mere awareness of the existence of such a plurality of passwords may cause the operator of the hostile computing system 108 to abandon efforts to access the application 106, as referenced above.

However, if the various false passwords are each a great distance from the actual password, then the operator of the hostile computing system 108 may be able to infer that the actual password is efficiently dissimilar from all other apparent passwords, and may thereby deduce the identity of the actual password. Thus, by ensuring that each false password is a maximum distance from the actual password, the password selector 126 may make it more difficult for the operator of the hostile computing system 108 to deduce the identity of the actual password, so that additional security is provided with respect to producing or eliminating an unauthorized access to the application 106.

The false password selector 126 also may use the strength calculator 120 in order to enhance a level of security provided by the password system 102. For example, as referenced above, it may be assumed in various implementations of the system 100 of FIG. 1 that the hostile computing system 108 attempting to gain access to the application 106 may proceed by attempting to iteratively calculate possibilities for the password of the user 104, to thereby access the application 106. As also referenced above, in such situations, the definition or concept of password strength may be inversely proportional to an amount of time and/or computing resources needed by the hostile computing system 108 to arrive at an associated password. In other words, the stronger the password is, the longer it will take and/or the more resources will be required, for the hostile computing system 108 to arrive at the password. Conversely, weaker passwords may be determined by the hostile computing system 108 in less time, and/or using fewer computing resources.

Therefore, the false password selector 126 may be specifically configured to select at least one false password which is known or thought to be weaker than the actual password of the user 104. Consequently, it may be assumed, or may be more likely, that in attempting to determine the password, the hostile computing system 108 will calculate the weaker false password first, before arriving at the actual password. In many situations, an operator of the hostile computing system 108 may thus believe that he or she has obtained the actual password, when in fact the weaker false password has been determined. As a result, the operator of the hostile computing system 108 may proceed with attempting to access the application 106 using the weaker, false password, and may thereby provoke an appropriate response by the password system 102, as described in detail herein.

At the same time, and similarly to the scenarios described above with respect to operations of the distance calculator 122, an operator of the hostile computing system 108 may not necessarily be assumed to proceed immediately with use of the first-obtained false password in attempting to access the application 106. For example, the operator of the hostile computing system 108 may, rather, attempt to exhaustively determine all available passwords for accessing the application 106. In this case, as described above, the operator of the hostile computing system 108 may discover that a plurality of such passwords appear to exist.

As in the context of distance calculations described above, it may be undesirable to have the actual password be substantially different, e.g., higher, in strength than the associated false passwords. For example, if ten such false passwords are associated with the actual password, and all ten passwords are significantly weaker in strength than the actual password, then the user of the hostile computing system 108 may appropriately deduce, by virtue of its disparate nature, the identity of the actual password.

Consequently, the false password selector 126 may ensure that at least some of the false passwords associated with the actual password of the user 104 are comparable to, or greater than, the strength of the actual password of the user 104. In this way, the operator of the hostile computing system 108 may experience greater difficulty in deducing than identity of the actual password, even when exhaustively determining all available/apparent passwords.

Thus, it may be observed from the above examples, that the false password selector 126 may utilize the strength calculator 120 and the distance calculator 122 in order to select false passwords in association with the actual password of the user 104, in a manner which enhances the functionality of, and value provided by, the password system 102. Specifically, the false password selector 126 may utilize the strength calculator 120 and the distance calculator 122 in order to ensure that the password system 102 provides an optimal type and amount of security associated with access to the application 106, in a manner which deters the user of the hostile computing system 108 while being transparent to the user 104 (i.e., which is least likely to confuse or otherwise inconvenience the user 104 during normal access of the application 106).

Thus, during selection of the password by the user 104, the false password selector 126 may govern operations of the false password generator 118, the strength calculator 120, and the distance calculator 122, in order to select a desired number and type of false passwords for association with the actual password of the user 104. Thereafter, the false password selector 126 may operate to store the thus-selected false passwords together with the actual password within the event repository 124.

It may be appreciated that the above-described functionality of the components 116-126 of the password system 102 may be implemented during any creation, update, maintenance, or other access of the password by the user 104, by the administrator of the password system 102, or by any other authorized user. As such, it may be appreciated that various other conventional functionalities associated with such password creation, updating, or maintenance may also be implemented by the password system 102, as would be apparent.

For example, as referenced above, creation of the password of the user 104 may be associated with a creation or selection of a user name or other identifier to be uniquely associated with the user 104 and used in conjunction with the password. As another example, the password manager 116 may utilize functionality of the strength calculator 120 during creation of the password. For example, in some settings, the password manager 116 may require that the user 104 select a password having a minimum strength, and may use the strength calculator 120 in order to ensure that this requirement is met.

Figure 2:
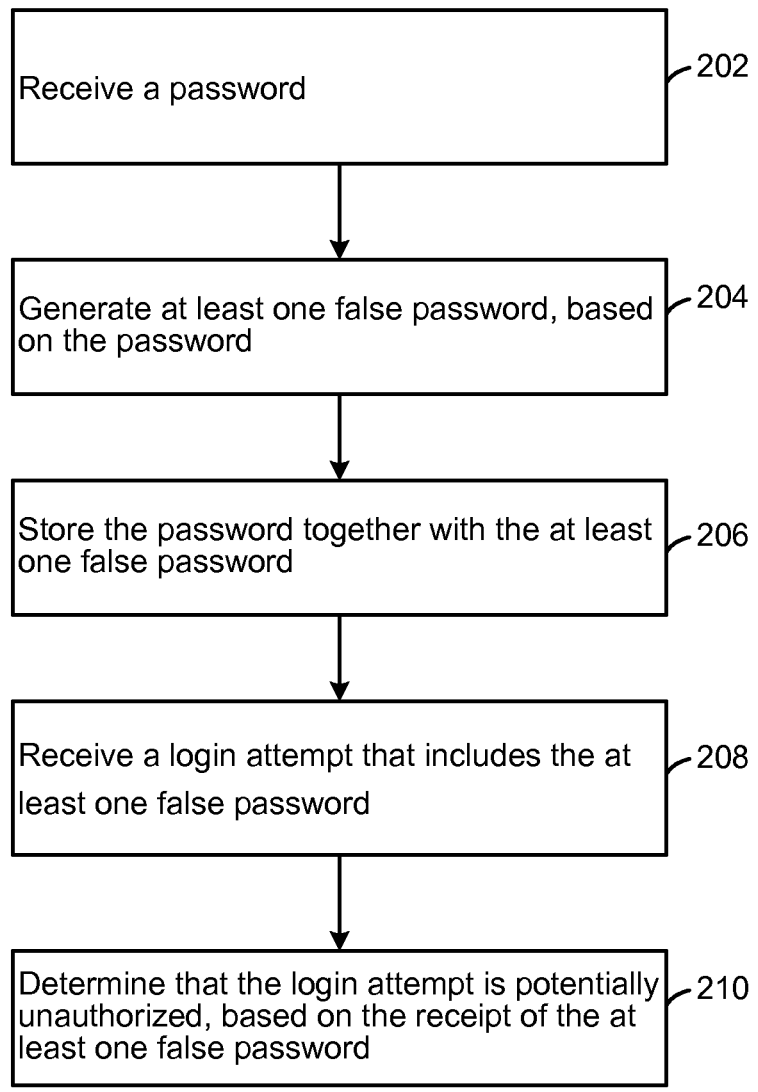
FIG. 2 is a flowchart illustrating example operations of the system of FIG. 1.
Figure 3:
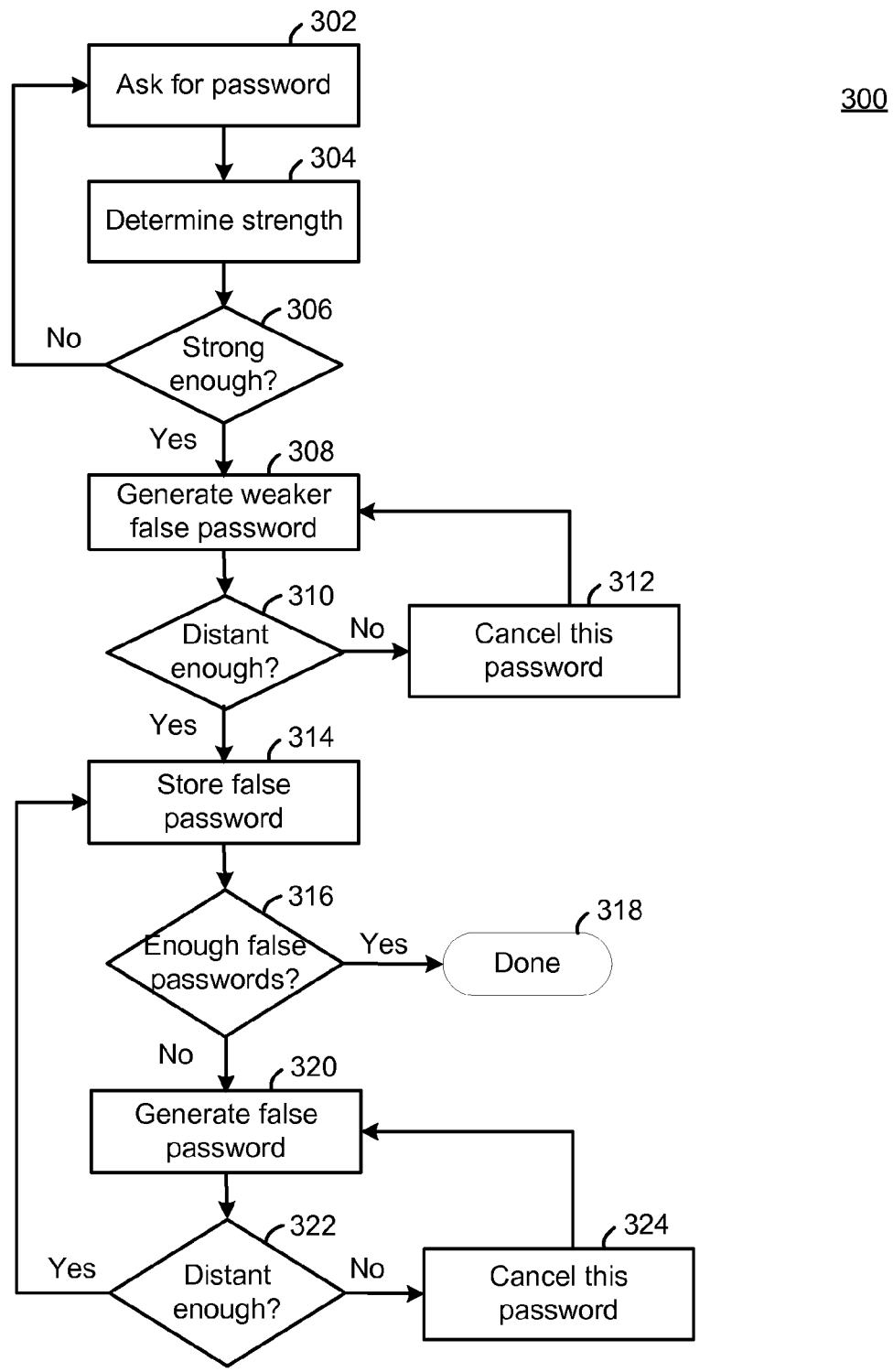
FIG. 3 is a flowchart illustrating example operations of the system of FIG. 1 that are associated with a selection of a password and generation of associated false passwords.

Other aspects of selection, creation, or other maintenance of the password by the user 104 or other authorized user are described herein, e.g., with respect to FIGS. 2 and 3, and/or would be apparent to one of skill in the art. For example, some systems or administrators may require that the user 104 update the actual password after the passage of some predetermined amount of time. In other examples, updating or changing of the password may be required after a certain number of failed attempts to access the application 106 by the user 104 (or an unauthorized party). Various other known circumstances and settings may be associated with a requirement to update or otherwise change the password of the user 104. In each such setting, it may occur that a new number of false passwords may be determined for subsequent association thereof with the new/updated password.

In any case, once a password has been associated with an appropriate number and type of false passwords and stored together therewith in the event repository 124, the password system 102 is thereafter prepared to accept input from the user 104, as well as other unauthorized or authorized users, such as, e.g., the user of the hostile computing system 108. Thus, during such times, the password system 102 may, in fact, receive input which includes the actual password, one of the false passwords, both, or neither.

More specifically, a password handler 128 may be configured to receive such input. That is, the password handler 128, by itself, may implement various conventional functionalities for receiving such input, including, e.g., receiving the actual password from the user 104, and comparing the actual password against a stored password which is stored together with a user name or other identifier of the user 104, e.g., within the password repository 124 or other appropriate storage. Of course, upon determination of receipt of the actual password, the password handler 128 may be configured to provide access to the application 106.

At other times, an attack detector 130 may be configured to analyze inputs in conjunction with the password handler 128, and to thereby recognize receipt of one or more of the false passwords stored within the password repository 126 in conjunction with the actual password. Upon such detection, the attack detector 130 may, e.g., access the password repository 124 to determine any other information which may be useful in responding to the perceived attack or other unauthorized access thought to be associated with receipt of the false password. For example, the attack detector 130 may determine an identity of the user 104 and associated information, or may determine a history of access events associated with access to the application 106 by the user 104, or any other information which may be associated with receipt of the false password and which may be considered to be potentially useful in responding thereto. Specifically, a response handler 132 may be configured to receive information from the attack detector 130 and to execute various functionalities and algorithms to determine an appropriate response to the perceived or potential attack.

In general, it may be appreciated that conventional techniques exist for responding to potential system attacks, so that the present description does not attempt to provide an exhaustively detailed listing or description of such response techniques. For the sake of illustration, however, it may be generally appreciated that the response handler 132 may be configured to take actions which are designed to, e.g., stop, slow down or otherwise inconvenience the perceived attacker, or to obtain an identity of the perceived attacker, in order to, e.g., apprehend the attacker and thereby prevent future such attacks.

A number of factors may be considered by the response handler 132 in determining an appropriate response to a receipt of a false password. For example, the response handler 132 may consider a designated level of importance of the security of the application 106, e.g., relative to other applications associated with the password system 102. Similarly, the response handler 132 may consider an identity or role of the user 104 in determining an appropriate response to receipt of the false password. Further, the response handler 132 may consider, in conjunction with the above and other factors, a current availability of resources in responding to the perceived attack. For example, as referenced above, the response handler 132 may be aware that the honey pot system 114 is currently available, and may thereby respond to receipt of the false password by providing access to the honey pot system 114. Thereafter, as referenced above, and as well known in the art, the honey pot system 114 may be used to track actions of the provider of the false password, and to thereby identify and possibly apprehend the provider of the false password.

In other situations, however, the honey pot system 114 may not be available, so that the response handler 132 may take other appropriate action. For example, the response handler 132 may provide a message to the provider of the false password that the application 106 is currently under repair or otherwise unavailable. In these and/or other examples, the response handler 132 may intentionally require a relatively lengthy wait before access to the application 106 is provided. As a result, the provider of the false password may be inconvenienced or otherwise deterred from perceiving and attempting to access the application 106.

In other examples, the response handler 132 may take action to restrict an access of the provider of the false password to the application 106. For example, the response handler 132 may provide access to only a portion of the application 106. For example, the response handler 132 may use the known Chroot technique to limit access of the provider of the false password by causing a desired folder to act or appear as a root folder within a system of the application 106. In this way, the provider of the false password, e.g., the operator of the hostile computing system 108 may effectively be limited from accessing an entirety of the application 106 and associated systems.

Thus, in the example of FIG. 1, the password system 102 provides for an association of a password of the user 104 with a plurality of false passwords, each of which may be selected as having associated characteristics which are cumulatively thought to enhance an overall security provided to the user 104 with respect to accessing the application 106. That is, the password system 102 increases the chances that the user 104 will be provided with such enhanced security, without requiring effort by, or even knowledge of, the various described operations of the password system 102.

Further, the password system 102, as described, may be configured to construct the plurality of false passwords, such that an operator of the hostile computing system 108 may be prevented or deterred from gaining unauthorized access to the application 106. In this regard, it may be appreciated that various examples are provided above which illustrate techniques by which a given plurality of false passwords may be generated and associated with the password of the user 104. Of course, such examples are not limiting, and additional or alternative techniques may be used.

For example, it may occur that one or more passwords may be included in the plurality of false passwords, which are specifically selected as being likely to be guessed by the operator of the hostile computing system 108, e.g., independently of the password of the user 104. For example, it is known that many users are prone to select certain passwords which are extremely easy to remember (and therefore easy for an operator of the hostile computing system 108 to guess), and/or which may be configured as the false passwords for the application 106. For example, some users may attempt to use their birthdate, street address, middle name, or other standard and/or easily-ascertainable information about themselves as the password for the application 106. In other examples, such users may select known passwords such as "administrator," "password," or other standard words or character strings which are known to be commonly used as passwords.

In general, operators of the hostile computing system 108 may thus attempt to utilize such passwords in attempting to gain unauthorized access to the application 106. Consequently, the false password selector 126 may be configured to include such passwords as false passwords to be stored with the password of the user 104. Inclusion of such passwords may be standard during an operation of the password system 102, or may be instituted on a case by case basis, e.g., by an operator or administrator of the password system 102. In this way, as with the various false passwords already described above, the operator of the hostile computing system 108 may select such a false password for entry to the password system 102 and attempt access to the application 106. Thus, as already described, the attack detector 130 may determine an unauthorized access based thereon, so that the various response strategies described above with respect to the response manager 132 may be employed.

In the example of FIG. 1, the password system 102 is illustrated as being implemented using at least one computing device 134, which includes at least one processor 134A together with computer readable storage media 134B. Thus, instructions may be stored on the computer readable storage media 134B, and executed by at least one processor 134A, in order to partially or wholly execute the various described components of the password system 102, and related components.

Of course, such implementation is not intended to be limiting, and merely provides example implementations, so that various other additional or alternative implementations would be apparent to one of skill in the art. For example, it may be appreciated that the computing device 134 may represent two or more computing devices, which may be connected, e.g., over a network. For example, some or all of the functionality of the password system 102 may be executed on a server computer, which is in communication with some or all of a client computer which may be local to the user 104. Further, it may be appreciated that the application 106 may also be executed using the computing device 134, or using a separate computing device (not shown).

Additionally, it may be appreciated that the various components of the password system 102 are illustrated individually for the sake of clarity of explanation. However, it may occur that functions of multiple components may be implemented wholly or partially using a single component. For example, the password handler 128 may implement some or all of the functionality of the attack detector 130. Conversely, a single one of the illustrated components may perform multiple functions described herein, and additional or alternative components or sub-components may be included beyond those specifically illustrated in the example of FIG. 1.

In still other examples, all of the application 106, the password system 102, and computing resources of the user 104 may be executed using the single computing device 134. In this case, the hostile computing system 108 may represent a system which intends to access the computing device 134, e.g., by direct connection, or over a network. Many other example configurations and variations of the system 100 of FIG. 1 would be apparent to one of skill in the art, and are therefore not discussed here in detail, except as may be necessary or helpful in understanding operations of the system 100 of FIG. 1.

FIG. 2 is a flowchart 200 illustrating example operations 202-210 of the system 100 of FIG. 1. In the example of FIG. 2, the operations 202-210 are illustrated in a sequential order. However, it may be appreciated that such illustration is not limiting, and is merely included for the sake of example. In additional or alternative implementations, the operations 202-210 may occur in a partially or wholly overlapping (e.g., parallel manner), or may occur in an order different than that illustrated in the example of FIG. 2. In addition, additional or alternative operations may be included, while various ones of the operations 202-210 may be omitted.

In the example of FIG. 2, a password may be received (202). For example, the password manager 116 may receive a password from the user 104 which the user 104 wishes to use for present and/or future access to the application 106. As described, the password manager 116 may utilize the strength calculator 120 in order to ensure a minimum strength of the selected password.

At least one false password may be generated, based on the password (204). For example, the false password generator 118 may generate a plurality of false passwords, e.g., using the password selected/provided by the user 104. In various examples described herein, for example, the false password generator 118 may generate a designated number of potential false passwords, e.g., by replacing various characters of the password selected by the user 104, and/or by adding or subtracting characters therefrom.

In various examples, as described, the false password generator 118 may generate a relatively large number of potential false passwords, whereupon the false password selector 126 may be configured to filter the thus-generated false passwords, or otherwise select a desired subset thereof. As described, the false password selector 126 may execute such a selection process, e.g., by ensuring that the selected false passwords each meet some desired criteria with respect to a strength thereof, and/or a distance therefrom, relative to the actual password of the user 104.

In other example implementations, the false password generator 118 may generate potential false passwords in more of an incremental fashion, e.g., may generate a potential false password which is then either included in, or discarded from, a final list of a plurality of false passwords to be associated with the actual password of the user 104. Again, it may be appreciated that the selection process of including or discarding a given potential false password may be based on various criteria related to a strength of the potential false password relative to the actual password, and/or based on a distance criteria associated with the distance of each potential false password from the actual password of the user 104.

The at least one false password may be stored together with the password (206). For example, the false password selector 126 may be configured to store the selected plurality of false passwords from the potential false passwords provided by the false password generator 118, e.g., within the password repository 124. As may be appreciated, and as referenced above, the associated false passwords may be stored together with other relative information, e.g., a user name or other log-in information that is associated with the user 104 and the actual password.

A log-in attempt that includes the at least one false password may be received (208). For example, the password handler 128 may receive at least one false password of the plurality of false passwords stored with the actual password within the password repository 124, e.g., from an operator of the hostile computing system 108.

The log-in attempt may be determined to be potentially unauthorized, based on the receipt of at least one false password (210). For example, the attack detector 130 may be configured to consider receipt of the false password provided by the operator of the hostile computing system 108, and to associate the false password with the actual password stored in the password repository 124, and/or with the user 104.

As described, various responses to the determination of potential attempted unauthorized access may be taken, e.g., by the response manager 132. For example, the provider of the false password may be redirected to the honey pot system 114. In other examples, the account of the user 104 may be locked from any access, until security of the account of the user 104 with respect to the application 106 is reassessed (e.g., until the password of the user 104 is reset to a new password).

In other examples, as described, the provider of the false password may be given only partial access to the application 106. In still other examples, access to the application 106 may be refused to the provider of the false password, and the password system 102, e.g., the response manager 132, may institute intentional delays until subsequent log-in attempts are allowed. In such scenarios, the provider of the false password may be explicitly notified that the application 106 is executing more slowly than normal, e.g., in an attempt to confuse or otherwise deter the provider of the false password. In other examples, such delays between log-in attempts may simply be executed without any explicit notification, again in the hopes of deterring the provider of the false password from further attempts at unauthorized access of the application 106.

FIG. 3 is a flowchart 300 illustrating additional example operations of the system 100 of FIG. 1. In particular, the example of FIG. 3 illustrates various operations of the components 116-126 of the password system 102, with respect to a selection or re-selection of the password of the user 104, and associated determination of false passwords to be associated therewith and stored within the password repository 124.

Thus, in the example of FIG. 3, the password manager 116 may ask for the password from the user 104 (302). In response to the thus-received password, the password manager 116 may determine the strength thereof (304), e.g., using the strength calculator 120. If the password is not strong enough (306), then the password manager 116 may ask for the password again, i.e., for an updated password (302), and may continue to determine the strength thereof (304), until a strong enough password is received (306).

At this point, the false password generator 118 may generate a false password which is weaker than the selected password (308). As described above, the purpose of generating and selecting a false password that is weaker than the actual password may be to maximize the likelihood that an operator of the hostile computing system 108 will determine the weaker false password prior to determining the actual password, e.g., during a "brute force" attempt to iteratively guess, derive, or otherwise determine the password of the user 104 for accessing the application 106.

If the thus-selected weaker false password is not distant enough from the actual password (310), then the weaker false password may be canceled and deleted (312). A subsequent weaker false password may then be generated (308), until a sufficiently distant weaker false password is obtained (310).

As also described above, the purpose of ensuring that the weaker false password meets or exceeds a minimum distance from the actual password may be to ensure that a low probability that the user 104 may inadvertently or unintentionally enter the weaker false password when attempting to access the application 106. In this way, as described, the user 104 may be potentially unaware and unencumbered by operations of the password system 102 as described herein.

As described, the distance calculator 122 may be configured to calculate the minimum distance in one or more of a variety of manners. For example, the distance calculator 122 may calculate a Hemming distance of the selected weaker false password from the actual password. Additionally, or alternatively, the distance calculator 122 may detect a distance of the weaker false password from the actual password based on physical considerations associated with a known or presumed keyboard layout thought to be used in providing the password and/or the weaker false password. In other words, in such scenarios, the distance calculator 122 may presume that false passwords may be determined based on the fact that users may more easily select password variations when the variations entail minimal physical differences, and associated minimal efforts on the part of the user in attempting the variations.

For example, as described, given a password having a certain string of characters, a second (false) password may have a corresponding string of characters, in which a given character within the password differs from its corresponding character within the different/false password in an amount which corresponds to the physical distance between the corresponding characters within a presumed keyboard layout.

Other aspects of correlating distance(s) between passwords with physical efforts required to implement corresponding differences between the passwords, relative to a given keyboard layout, may also be considered. For example, requiring a user to press the shift key in combination with a corresponding character may be equated with an increase in distance corresponding to replacing the same character with a character that is a given distance therefrom within the keyboard layout. Thus, in general, it may be appreciated that such distance calculations generally rely on, or refer to, correlation(s) between physical effort needed by a user to modify a given password to obtain a variation thereof with a distance there between.

Once a weaker false password is determined to be sufficiently distance (310), the thus-determined false password may be stored (314), e.g., in the password repository 124. If sufficient false passwords have been stored at this point (316), then operations may cease (318). Otherwise (316), a further false password may be generated (320). In such examples, as referenced above, it may occur that such further false passwords may have a random strength relative to the actual password. Moreover, in certain examples, such further-generated false passwords may specifically be designed to be of comparable or greater strength than the actual password, so as, e.g., to confuse an operator of the hostile computing system 108 and to thereby make it more difficult for the operator of the hostile computing system 108 to determine the actual password from the plurality of false passwords.

Such further-generated false passwords may still be determined to be sufficiently distant from the actual password (322). If not distant enough, the false password may be canceled (324), and a further false password may be generated (320). On the other hand, if distant enough (322), then the thus-generated false password may again be stored (314), e.g., within the password repository 124. In this way, operations of the flowchart 300 may continue until a desired number of false passwords, having a desired distribution of characteristics of strength and distance have been obtained.

Thus, FIG. 3 generally illustrates example implementations in which a single, weaker false password is initially selected, and subsequently joined with a plurality of additional false passwords which have strength which are comparable to that of the actual password. Of course, FIG. 3 is merely one non-limiting example of various false password selection techniques which may be used.

For example, as referenced above, alternative implementations may be used in which a plurality of false passwords are generated initially by the false password generator 118, and subsequently a subset thereof is selected by the false password selector 126 as having the desired range and type of strength/distance characteristics thought to be optimal in stopping or deterring a particular operator of the hostile computing system 108. Additional or alternative implementations for generation and selection of false passwords to be associated with the password of the user 104 are provided below with respect to the pseudo code sections 1 and 2.

Figure 4:
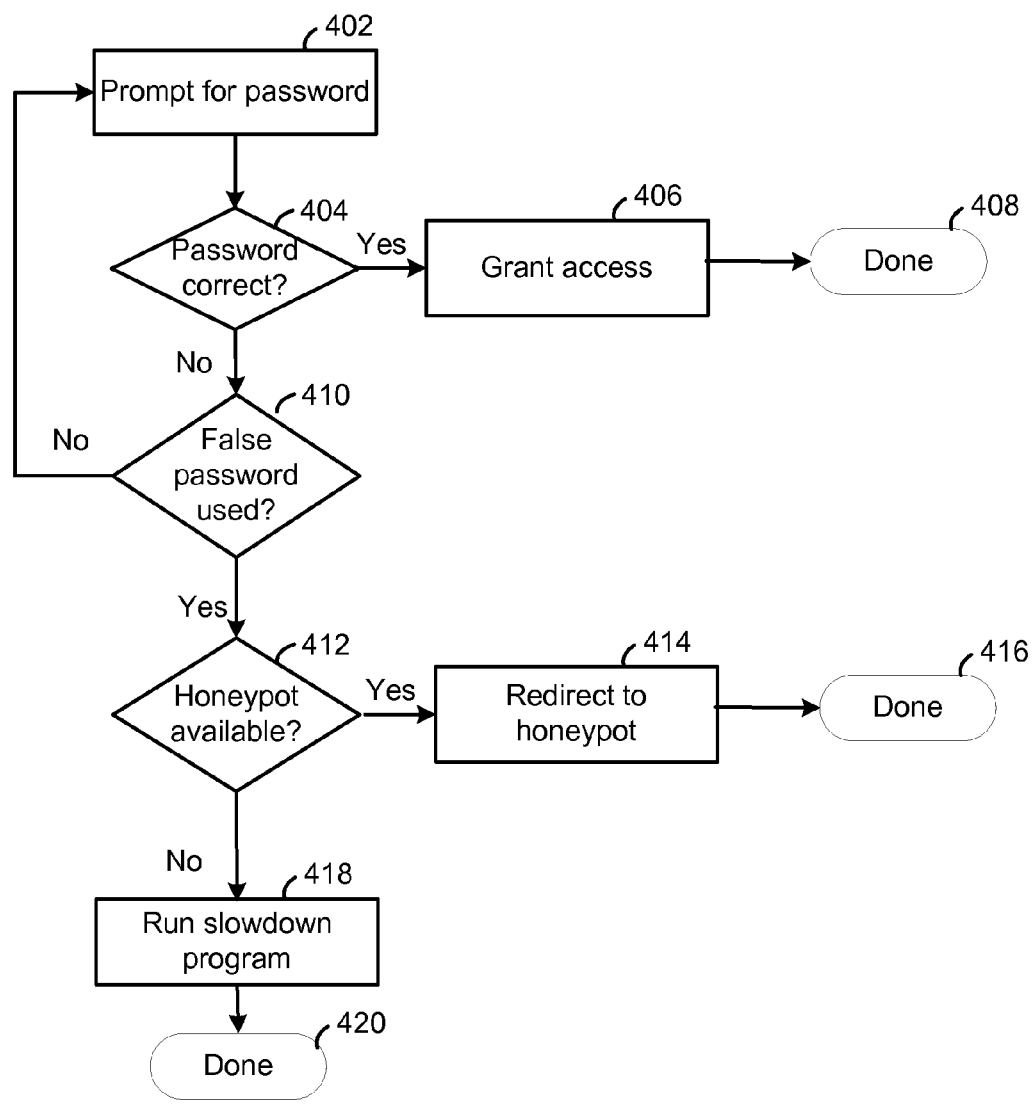
FIG. 4 is a flowchart illustrating example operations of the system of FIG. 1 associated with an execution of password protection schemes using false passwords.

FIG. 4 is a flowchart 400 illustrating operations of the password system 102 during one or more log-in attempts to the application 106. That is, it may be appreciated that FIG. 4 generally refers to operation(s) of the password handler 128, the attack detector 130, and the response manager 132 during receipt of actual, false, or incorrect passwords by various authorized or unauthorized users.

Thus, in the example of FIG. 4, the password system 102, e.g., the password handler 128, may prompt for input of a password (402), e.g., on behalf of, or in conjunction with, the application 106. For example, as referenced above, such prompt may be provided in response to an attempt to access the application over the internet or other network. In other examples, the password prompt may be provided by the password handler 128, during a local access of the application 106 by the user 104 (i.e., during access of the computing device 134 by the user 104). If the subsequently-received password is judged to be correct (404), then access to the application 106 may be granted by the password handler 128 (406), and operations of the flowchart 400 may be complete (408).

If, however, the received password is judged to be incorrect (404), then the attack detector 130 may determine whether a false password associated with the expected password was received (410). If not, then it may be assumed that no attack or other authorized activity is underway, but that, e.g., an incorrect password has been provided. For example, the user 104 may simply make a typographical error in providing the actual password. In this case, the password handler 128 may simply prompt for the password again (402). On the other hand, if the attack detector 130 determines that one of the false passwords associated with the expected password has been received (410), then the attack detector 132 may notify the response manager 132.

Subsequently, the response manager 132 may proceed with appropriate action and response thereto. For example, the response manager 132 may determine whether a honey pot system 114 is currently available (412). If so, then the response manager 132 may then redirect a provider of the false password to the honey pot system 114 (414), in which case operations of the flowchart 400 may complete (416).

On the other hand, if no honey pot is currently available (412), then the response manager 132 may execute a slow down program (418) before completing operations (420). For example, as referenced above, the response manager 132 may purposely slow an operation of the password handler 128 in responding to a provider of the false password, and/or may notify the provider of the false password that the application 106 is running more slowly than normal (so as to deter or discourage the provider of the false password).

Many other variations of operations of the system 100 of FIG. 1, and variations thereof, may be implemented. For example, various strength and distance calculation may be used, such as, e.g., weighting particular characters or character strings in a desired fashion. Strength may be associated with a number of attempts or amount of time required by a known password attack manager 110 to determine the password, and/or a direct correspondence between a length of a password and its strength may be presumed.

Pseudo code sections 1 and 2 are provided below to illustrate additional or alternative examples illustrating techniques for generating and selecting false passwords to be associated with a given actual password. Comment sections are included in each pseudo code section in order to explain and clarify portions thereof.

In Pseudo Code 1, a group of potential false passwords are generated, and then associated constraints are checked for each false password. In contrast, in Pseudo Code 2, a more incremental approach is taken in which potential false passwords are generated individually, and the constraints are also checked for each password individually until a desired number of false passwords is reached. More specifically, the associated password generation for incremental approaches such as that of Pseudo Code 2 may be to extract a selected character of the real password, and to generate passwords based on modifying the password character by character, while maintaining updated values of 'current strength' and 'current distance' until a desired number of false passwords having the desired characteristics is reached.

As described above (e.g., with respect to FIG. 3), some of the false passwords may be purposefully selected to be weaker than the actual password, so that a hostile party may be likely to guess the weaker password before guessing the actual password. On the other hand, some of the false passwords may be determined to have a strength that is comparable to (or greater than) a strength of the actual password, so that the hostile party who exhaustively determines all or most of the false passwords in conjunction with the actual password will not easily be able to identify the actual password based on its disparate strength relative to all the false passwords. In Pseudo Code sections 1 and 2, the latter type of false passwords having strengths comparable to or greater than the actual password are referred to as bait passwords so as to distinguish from the former type of false password which is designed to be weaker than the actual password.

PSEUDO-CODE 1

```
// defines how far the bait passwords should be from the
actual password in order to avoid accidental input of a false
password by the user
    DEFINE MINDISTANCE 5;
    // used to keep false passwords' appearance similar to the
actual password. Used to confuse about which password is correct.
−1 means infinite.
    DEFINE MAXDISTANCE −1;
    // the type of keyboard expected to be used
    DEFINE KEYBOARD_LAYOUT: English (United States)
    // a list of characters to check against for detecting presence
of special chars in a password
    DEFINE SPECIALCHARS !@#$%^&*()+={ }[ ]|\:;"'<>,?/
    // total number of false passwords to select
    DEFINE NUMBEROFFALSEPASSWORDS = 10;
    // minimal and maximal length for generated passwords
    DEFINE MAXPASSWORDLENGTH = 25;
    DEFINE MINPASSWORDLENGTH = 4;
    determineStrength(password) {
    // strength is defined by: password length, existence of
different types of chars (lowercase, uppercase, numbers, special
chars); additional/alternative metrics
        strength = 0;
        if(password.length( )) > 5 strength++;
        if(password.length( )) > 7 strength++;
        if(password.length( )) > 19 strength++;
        if(password.hasLowerCaseChars( )) strength++;
        if(password.hasUpperCaseChars( )) strength++;
        if(password.hasNumbers( )) strength++;
        if(password.hasSpecialChars( )) strength++;
        return strength;
    }
    determineDistance(password1, password2) {
    // distance increases with the difference in length between
the password and each false password
    // distance increases for each key with the physical distance
between the keys (e.g., Q and W are at distance 1, Q and U are at
distance 6 for a QWERTY keyboard)
        distance = 0;
        distance += ABS(password1.length( ) − password2.length( ));
        for(i = 0; i< MIN(password1.length( ), password2.length( )); i++) {
            distance+=keyboardDistance(password1.getChar(i), password2.getChar(i));
        }
        return distance;
    }
```

PSEUDO-CODE 1 (continued)

```
generateWeakerPassword(realPassword, maxStrength) {
  // 1- generate password characteristics
  weakLength =
RND(MINPASSWORDLENGTH,realPassword.length( ));
  // 2- generate password
  while (weakPassword.length( ) < weakLength) {
    weakPassword.append(GetRandomChar( ));
  }
  // 3- ensure strength is less than a maximum strength
  if(determineStrength(weakPassword) > maxStrength)
return;
  // failed in generating the false password, if "done" == false
then try again
  // 4- make sure that the distance is big enough
  if(determineDistance(weakPassword, realPassword) <
MINDISTANCE) return;
  // failed in generating the password, if "done" == false then
try again
  // 5- make sure that the distance is not too big
  if(MAXDISTANCE > 0)
    if(determineDistance(falsePassword, realPassword) >
MAXDISTANCE) return;
  // failed in generating the password, if "done" == false then
try again
  // 6- (optional) verify that known bruteforce attack tools
find the weaker password before the real one
  result = invoke(exe, realpassword, weakpassword);
  if(result == realpassword) return; //
  failed in generating the password, if "done" == false then
try again
  // 7- store the weaker password in false password list
  baitPasswordList.append(weakpassword);
  // condition for completing the weaker password generation
  done = true;
}
generateBaitPassword(realPassword) {
  // generation of bait passwords is similar to generation of
the weaker password, with fewer tests to perform
  // 1- generate password characteristics
  baitLength =
RND(MINPASSWORDLENGTH,MAXPASSWORDLENGTH);
  // 2- generate password
  while (baitPassword.length( ) < baitLength) {
    baitPassword.append(GetRandomChar( ));
  }
  // 3- ensure that the distance is big enough
  if(determineDistance(baitPassword, realPassword) <
MINDISTANCE) return;
  // 4- ensure that the distance is not too big
  if(MAXDISTANCE > 0)
    if(determineDistance(baitPassword, realPassword) >
MAXDISTANCE) return;
  // 5- store the bait password in the bait password list
  baitPasswordList.append(baitpassword);
}
generateBaitPasswords(realPassword) {
  // 1- determine the strength of the real password
  realPasswordStrength = determineStrength(realPassword);
  done = false;
  // 2- generate one weaker password, that will be cracked
before the real one
  while(done == false) {
    generateWeakerPassword(realPassword,
realPasswordStrength −1);
  }
  // 3- generate random additional passwords
  while(baitPasswordList.length( ) <
NUMBEROFBAITPASSWORDS) {
    generateBaitPassword(realPassword);
  }
  // all bait passwords have been generated. Storing the
passwords may include storing MD5 checksum only.
}
```

As referenced above, Pseudo Code 2 takes a different approach. Specifically, as shown, password generation in Pseudo Code 2 may be more efficient, and may include moveCloser( ) and moveFarther( ) functions, which may be implemented in a manner appropriate to an expected keyboard layout. For example, for a QWERTY keyboard, moveCloser('Q', 'R') will return 'E' (since 'E' is physically one key closer to Q than R is). Meanwhile, moveFarther('Q', 'R') will return 'T' for the same reason. These functions also may consider diagonals (i.e. moveCloser('Q', 'Z') will return 'A'), as well as keys such as SHIFT (i.e., again on a QWERTY layout, the key/will be at a distance 1 from '?' ('SHIFT'+'/' or '/' while in Caps Lock mode) and from +('/' while in Num Lock mode).

In case of banned characters that are not allowed to be included in a selected password, then the method of the above function may either return a valid character at the same distance, or return a valid character at distance +1 in case no valid character at distance 1 exists. For example, 'P' may be designated as being at distance 1 from 'O', '{' and '0'. If special chars are banned, then only '{' would not be returned. Also, only special chars are close to '}'. MoveCloser('Q', '}') should return '{'. If special chars are banned, then the method should for example return 'P', which is 2 steps closer (and not just 1 step closer).

PSEUDO-CODE 2

```
generateBaitPassword(realPassword) {
  passwordLength =
RND(MINPASSWORDLENGTH,MAXPASSWORDLENGTH);
  // initialize a default password
  for(i=0; i<passwordLength; i++)
    password.append(getRandomChar( ));
  currentDistance = determineDistance(realPassword, password);
  // edit the new password, character by character, staying within the
  // distance bounds
  while((currentDistance > MAXDISTANCE) or (currentDistance <
MINDISTANCE)) {
    if(referenceDistance < MINDISTANCE) {
      // too close to the real password. Pick one char at random and
put false password one 'step' further
      index = RND(0, password.length( ));
      password.chatAt(index) =
moveCloser(realPassword.charAt(index), password.charAt(index));
    } else if (referenceDistance > MAXDISTANCE) {
      // need to decrease the distance; pick one char at random and
put false password one 'step' closer
      index = RND(0, password.length( ));
      password.chatAt(index) =
moveFarther(realPassword.charAt(index), password.charAt(index));
    }
  }
  // generating a weaker password is similar to generating a bait
password, with the restriction that the strength of the weak password is
weaker.
  generateWeakPassword(realPassword) {
  passwordLength =
RND(MINPASSWORDLENGTH,realPassword.length( ));
  // ban certain types of characters amongst lowercase, uppercase,
numbers and special chars and restrict to the types present in the real
password
  hasLowerCase = realPassword.hasLowerCase( );
  hasUpperCase = realPassword.hasUpperCase( );
  hasNumbers = realPassword.hasNumbers( );
  hasSpecialChars = realPassword.hasSpecialChars( );
  // initialize a default password
  for(i=0; i<passwordLength; i++)
    password.append(getNonBannedRandomChar(hasLowerCase,
hasUpperCase, hasNumbers, hasSpecialChars));
  referenceStrength = determineStrength(realPassword);
  currentStrength = determineStrength(password);
  if(currentStrength >= referenceStrength) {
    // failed to generate a weaker password.
    return;
  }
  currentDistance = determineDistance(realPassword, password);
  // edit the new password, character by character. The idea is to stay
```

-continued

PSEUDO-CODE 2

```
within the distance bounds and to respect the range of allowed characters
    while((currentDistance > MAXDISTANCE) or (currentDistance <
MINDISTANCE)) {
        if(referenceDistance < MINDISTANCE) {
            // too close to the real password, pick one char at random and
put false password one 'step' further, taking into account banned
characters
            index = RND(0, password.length( ));
            password.chatAt(index) =
moveCloser(realPassword.charAt(index), password.charAt(index),
hasLowerCase, hasUpperCase, hasNumbers, hasSpecialChars);
        } else if(referenceDistance > MAXDISTANCE) {
            // need to decrease the distance, pick one char at random and put
false password one 'step' closer, taking into consideration banned
characters in order not to strengthen the password too much
            index = RND(0, password.length( ));
            password.chatAt(index) =
moveFarther(realPassword.charAt(index), password.charAt(index),
hasLowerCase, hasUpperCase, hasNumbers, hasSpecialChars);
        }
    }
    if(password.getCurrentStrength( ) >= referenceStrength) return;
        // failed to generate a weaker password.
}
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system for generating false passwords, the system comprising:
   at least one processor;
   a non-transitory computer-readable medium including instructions, when executed by the at one processor, are configured to implement,
   a password manager configured to cause the at least one processor to receive a password;
   a false password generator configured to cause the at least one processor to generate a plurality of false passwords based on the password;
   a distance calculator configured to cause the at least one processor to calculate a distance of each of the plurality of false passwords from the password, each distance representing a similarity, or lack thereof, of a corresponding false password to the password; and
   a false password selector configured to cause the at least processor to select a subset of false passwords having distances equal to or above a minimum distance from the password and less than a maximum distance from the password to reduce odds of an inadvertent entry of a false password supplied by a user,
   the false password selector configured to store the subset of false passwords together with the password.

2. The computer system of claim 1 wherein the false password generator is configured to cause the at least one processor to generate the plurality of false passwords including replacing at least one character of the password for each of the plurality of false passwords.

3. The computer system of claim 1 comprising a strength calculator configured to cause the at least one processor to calculate a strength of each of the plurality of false passwords generated by the false password generator,
   wherein the false password selector is configured to additionally select the subset of false passwords from the plurality of false passwords, based on the calculated strengths.

4. The computer system of claim 3, wherein the false password selector is configured to additionally select the subset of false passwords from the plurality of false passwords, based on the calculated strengths, including a first false password having a strength greater than the password and a second false password having a strength less than the password.

5. The computer system of claim 1, wherein the password and the plurality of false passwords each include characters corresponding to characters on a keyboard, and wherein the distance is calculated at least partially based on a physical distance, in a relevant keyboard layout, between a keyboard character of the password and a corresponding keyboard character of each of the plurality of false passwords.

6. The computer system of claim 1 comprising:
   a password handler configured to cause the at least one processor to receive a login attempt including at least one false password among the subset of false passwords; and
   an attack detector configured to cause the at least one processor to determine that the login attempt is potentially unauthorized, based on the receipt of the at least one false password.

7. The computer system of claim 6 comprising:
   a response manager configured to determine a response to the potentially unauthorized login attempt.

8. The computer system of claim 7, wherein the response manager is configured to cause the at least one processor to redirect the login attempt to a honeypot system.

9. A computer-implemented method for causing at least one processor to execute instructions recorded on a computer-readable storage medium, the method comprising:
   receiving, including the at least one processor, a password;
   generating, including the at least one processor, a plurality of false passwords, based on the password;
   calculating, including the at least one processor, a distance of each of the plurality of false passwords from the password, each distance representing a similarity, or lack thereof, of a corresponding false password to the password;
   selecting, including the at least one processor, a subset of false passwords having distances equal to or above a minimum distance from the password and less than a maximum distance from the password to reduce odds of an inadvertent entry of a false password supplied by a user;
   storing, including the at least one processor, the password together with the subset of false passwords;
   receiving, including the at least one processor, a login attempt that includes at least one false password from the subset of false passwords; and
   determining, including the at least one processor, that the login attempt is potentially unauthorized, based on the receipt of the at least one false password.

10. The computer-implemented method of claim 9, further comprising:
   calculating, including the at least one processor, a strength of each of the plurality of false passwords; and
   selecting, including the at least one processor, the subset of false passwords from the plurality of false passwords, based on the calculated strengths.

11. The computer-implemented method of claim 10, wherein the selecting the subset of false passwords from the plurality of false passwords, based on the calculated strengths includes selecting a first false password having a strength greater than the password and a second false password having a strength less than the password.

12. The computer-implemented method of claim 9, comprising responding to the potentially unauthorized login attempt including redirecting the login attempt to a honeypot system.

13. A computer program product, the computer program product being tangibly embodied on a non-transitory computer-readable medium and comprising instructions that, when executed, are configured to cause at least one processor to:
   receive a password;
   generate a plurality of false passwords, based on the password;
   calculate a distance of each of the plurality of false passwords from the password, each distance representing a similarity, or lack thereof, of a corresponding false password to the password;
   select a subset of false passwords having distances equal to or above a minimum distance from the password and less than a maximum distance from the password to reduce odds of an inadvertent entry of a false password supplied by a user;
   store the password together with the subset of false passwords;
   receive a login attempt that includes at least one false password among the subset of false passwords; and
   determine that the login attempt is potentially unauthorized, based on the receipt of the at least one false password.

14. The computer program product of claim 13, wherein the instructions include instructions that, when executed, are configured to cause the at least one processor to:
   calculate a strength of each of the plurality of false passwords generated by the false password generator;
   select the subset of false passwords from the plurality of false passwords, based on the calculated strengths, including selecting a first false password having a strength greater than the password and a second false password having a strength less than the password.

* * * * *